(12) United States Patent
Lu et al.

(10) Patent No.: US 11,859,517 B2
(45) Date of Patent: Jan. 2, 2024

(54) POWER PRODUCTION WITH COGENERATION OF FURTHER PRODUCTS

(71) Applicant: 8 Rivers Capital, LLC, Durham, NC (US)

(72) Inventors: Xijia Lu, Durham, NC (US); Brock Alan Forrest, Durham, NC (US); Navid Rafati, Durham, NC (US)

(73) Assignee: 8 Rivers Capital, LLC, Durham, NC (US)

(*) Notice: Subject to any disclaimer, the term of this patent is extended or adjusted under 35 U.S.C. 154(b) by 87 days.

(21) Appl. No.: 17/618,196

(22) PCT Filed: Jun. 12, 2020

(86) PCT No.: PCT/IB2020/055536
§ 371 (c)(1),
(2) Date: Dec. 10, 2021

(87) PCT Pub. No.: WO2020/250194
PCT Pub. Date: Dec. 17, 2020

(65) Prior Publication Data
US 2022/0099003 A1  Mar. 31, 2022

Related U.S. Application Data

(60) Provisional application No. 62/860,974, filed on Jun. 13, 2019.

(51) Int. Cl.
*F01K 23/06* (2006.01)
*C01B 3/50* (2006.01)
(Continued)

(52) U.S. Cl.
CPC ............. *F01K 23/064* (2013.01); *C01B 3/50* (2013.01); *F01K 7/06* (2013.01); *F01K 23/068* (2013.01);
(Continued)

(58) Field of Classification Search
CPC ........ F01K 23/064; F01K 23/068; F01K 7/16; F01K 25/103; C01B 3/50;
(Continued)

(56) References Cited

U.S. PATENT DOCUMENTS 4,185,456 A   1/1980   Cummings
4,498,289 A   2/1985   Osgerby
(Continued)

FOREIGN PATENT DOCUMENTS

CN   106401749   2/2017
DE   10 2009 032 718   2/2011
(Continued)

*Primary Examiner* — Steven M Sutherland
(74) *Attorney, Agent, or Firm* — Womble Bond Dickinson (US) LLP

(57) ABSTRACT

The present disclosure relates to cogeneration of power and one or more chemical entities through operation of a power production cycle and treatment of a stream comprising carbon monoxide and hydrogen. A cogeneration process can include carrying out a power production cycle, providing a heated stream comprising carbon monoxide and hydrogen, cooling the heated stream comprising carbon monoxide and hydrogen against at least one stream in the power production cycle so as to provide heating to the power production cycle, and carrying out at least one purification step so as to provide a purified stream comprising predominately hydrogen. A system for cogeneration of power and one or more chemical products can include a power production unit, a syngas production unit, one or more heat exchange elements configured for exchanging heat from a syngas stream from the syngas production unit to a stream from the power production unit, and at least one purifier element configured to separate the syngas stream into a first stream comprising predominately hydrogen and a second stream.

20 Claims, 4 Drawing Sheets

(51) Int. Cl.
*F01K 7/06* (2006.01)
*F01K 25/10* (2006.01)

(52) U.S. Cl.
CPC ...... *F01K 25/103* (2013.01); *C01B 2203/042* (2013.01); *C01B 2203/0405* (2013.01); *C01B 2203/0475* (2013.01); *C01B 2203/068* (2013.01); *C01B 2203/0883* (2013.01); *C01B 2203/14* (2013.01); *C01B 2203/84* (2013.01)

(58) Field of Classification Search
CPC ...... C01B 2203/0405; C01B 2203/042; C01B 2203/0475; C01B 2203/068; C01B 2203/0883; C01B 2203/14; C01B 2203/84
See application file for complete search history.

(56) References Cited

U.S. PATENT DOCUMENTS

| | | | |
|---|---|---|---|
| 4,725,380 A | 2/1988 | Pinto | |
| 6,214,066 B1 | 4/2001 | Nataraj et al. | |
| 6,301,927 B1 | 10/2001 | Reddy | |
| 6,474,069 B1 | 11/2002 | Smith | |
| 6,500,241 B2 | 12/2002 | Reddy | |
| 6,534,551 B2 | 3/2003 | Allam et al. | |
| 6,932,958 B2 | 8/2005 | Wangerow et al. | |
| 6,946,016 B2 | 9/2005 | Reddy | |
| 6,966,171 B2 | 11/2005 | Uematsu et al. | |
| 7,056,480 B2 | 6/2006 | Ogawa | |
| 7,089,727 B2 | 8/2006 | Schütz | |
| 7,138,001 B2 | 11/2006 | Knez et al. | |
| 7,179,324 B2 | 2/2007 | Baksh et al. | |
| 7,182,917 B2 | 2/2007 | Krueger | |
| 7,182,921 B2 | 2/2007 | Miura et al. | |
| 7,192,569 B2 | 3/2007 | Stewart | |
| 7,220,505 B2 | 5/2007 | Malhotra et al. | |
| 7,247,656 B2 | 7/2007 | Guo et al. | |
| 7,252,692 B2 | 8/2007 | Rei | |
| 7,326,482 B2 | 2/2008 | Haltiner, Jr. et al. | |
| 7,341,609 B2 | 3/2008 | DeVries | |
| 7,393,382 B2 | 7/2008 | Givens | |
| 7,399,342 B2 | 7/2008 | Bizjak | |
| 7,404,846 B2 | 7/2008 | Golden et al. | |
| 7,419,648 B2 | 9/2008 | Kuipers et al. | |
| 7,427,368 B2 | 9/2008 | Drnevich | |
| 7,467,519 B2 | 12/2008 | Raybold et al. | |
| 7,550,215 B2 | 6/2009 | Malhotra et al. | |
| 7,574,855 B2 | 8/2009 | Benz et al. | |
| 7,611,676 B2 | 11/2009 | Inage | |
| 7,628,963 B2 | 12/2009 | Woo et al. | |
| 7,635,399 B2 | 12/2009 | Su | |
| 7,686,856 B2 | 3/2010 | Hemmings | |
| 7,695,708 B2 | 4/2010 | Peng et al. | |
| 7,708,812 B2 | 5/2010 | Shinkai et al. | |
| 7,727,509 B2 | 6/2010 | Abbott et al. | |
| 7,731,935 B2 | 6/2010 | Brady et al. | |
| 7,763,086 B2 | 7/2010 | Woods et al. | |
| 7,763,098 B2 | 7/2010 | Alizadeh-Khiavi et al. | |
| 7,815,892 B2 | 10/2010 | Hershkowitz et al. | |
| 7,828,864 B2 | 11/2010 | Edlund et al. | |
| 7,833,311 B2 | 11/2010 | Givens | |
| 7,833,326 B2 | 11/2010 | Bizjak | |
| 7,837,765 B2 | 11/2010 | Adams et al. | |
| 7,837,973 B2 | 11/2010 | Snyder et al. | |
| 7,883,672 B2 | 2/2011 | Woo et al. | |
| 7,908,842 B2 | 3/2011 | Eroglu et al. | |
| 7,914,764 B2 | 3/2011 | Hershkowitz et al. | |
| 7,931,888 B2 | 4/2011 | Drnevich et al. | |
| 7,932,296 B2 | 4/2011 | Malhotra et al. | |
| 7,950,239 B2 | 5/2011 | Lilley et al. | |
| 7,960,441 B2 | 6/2011 | Wolf | |
| 7,985,399 B2 | 7/2011 | Drnevich et al. | |
| 7,988,948 B2 | 8/2011 | Guvelioglu et al. | |
| 8,021,464 B2 | 9/2011 | Gauthier et al. | |
| 8,025,862 B2 | 9/2011 | Rojey et al. | |
| 8,034,321 B2 | 10/2011 | Mauthner et al. | |
| 8,038,748 B2 | 10/2011 | Edlund | |
| 8,038,771 B2 | 10/2011 | Bizjak | |
| 8,070,841 B2 | 12/2011 | Adams et al. | |
| 8,080,070 B2 | 12/2011 | Grover | |
| 8,097,371 B2 | 1/2012 | Suehiro et al. | |
| 8,110,022 B2 | 2/2012 | DeVries | |
| 8,124,049 B2 | 2/2012 | Grover | |
| 8,137,422 B2 | 3/2012 | Licht et al. | |
| 8,177,868 B2 | 5/2012 | Johnston | |
| 8,187,363 B2 | 5/2012 | Grover | |
| 8,206,669 B2 | 6/2012 | Schaffer et al. | |
| 8,240,370 B2 | 8/2012 | Palamara et al. | |
| 8,257,452 B2 | 9/2012 | Menzel | |
| 8,257,668 B2 | 9/2012 | Mukai et al. | |
| 8,263,274 B2 | 9/2012 | Sonnichsen et al. | |
| 8,268,024 B2 | 9/2012 | Price | |
| 8,273,139 B2 | 9/2012 | Malhotra et al. | |
| 8,273,489 B2 | 9/2012 | Ukai et al. | |
| 8,287,763 B2 | 10/2012 | Pham et al. | |
| 8,303,930 B2 | 11/2012 | Chen et al. | |
| 8,375,723 B2 | 2/2013 | Benz et al. | |
| 8,394,174 B2 | 3/2013 | Chen et al. | |
| 8,414,666 B2 | 4/2013 | Palamara et al. | |
| 8,419,829 B2 | 4/2013 | Wallace | |
| 8,449,633 B2 | 5/2013 | Pham et al. | |
| 8,449,649 B2 | 5/2013 | Greenough | |
| 8,460,630 B2 | 6/2013 | Niitsuma et al. | |
| 8,486,180 B2 | 7/2013 | Chen | |
| 8,535,638 B2 | 9/2013 | Terrien et al. | |
| 8,551,217 B2 | 10/2013 | Baksh et al. | |
| 8,596,075 B2 | 12/2013 | Allam et al. | |
| 8,597,383 B2 | 12/2013 | Pham et al. | |
| 8,617,294 B2 | 12/2013 | Adams et al. | |
| 8,623,563 B2 | 1/2014 | Anzai | |
| 8,636,922 B2 | 1/2014 | Grover et al. | |
| 8,671,688 B2 | 3/2014 | Rogers et al. | |
| 8,673,135 B2 | 3/2014 | Colyar et al. | |
| 8,685,282 B2 | 4/2014 | Iaquaniello | |
| 8,685,358 B2 | 4/2014 | Allam | |
| 8,690,972 B2 | 4/2014 | Takata et al. | |
| 8,692,034 B2 | 4/2014 | Han | |
| 8,702,823 B2 | 4/2014 | Kani et al. | |
| 8,715,617 B2 | 5/2014 | Genkin et al. | |
| 8,726,628 B2 | 5/2014 | Wichmann et al. | |
| 8,747,498 B2 | 6/2014 | Taguchi et al. | |
| 8,747,806 B2 | 6/2014 | Catchpole | |
| 8,752,390 B2 | 6/2014 | Wright et al. | |
| 8,769,961 B2 | 7/2014 | Allam | |
| 8,771,637 B2 | 7/2014 | Wynn et al. | |
| 8,776,532 B2 | 7/2014 | Allam et al. | |
| 8,784,531 B2 | 7/2014 | Okada et al. | |
| 8,790,618 B2 | 7/2014 | Adams et al. | |
| 8,808,425 B2 | 8/2014 | Genkin et al. | |
| 8,852,456 B2 | 10/2014 | Valentin et al. | |
| 8,869,889 B2 | 10/2014 | Palmer et al. | |
| 8,900,355 B2 | 12/2014 | White | |
| 8,900,546 B2 | 12/2014 | Van De Graaf et al. | |
| 8,916,304 B2 | 12/2014 | Tamura et al. | |
| 8,926,866 B2 | 1/2015 | Kim et al. | |
| 8,956,587 B1 | 2/2015 | Peng et al. | |
| 8,959,887 B2 | 2/2015 | Allam et al. | |
| 8,986,002 B2 | 3/2015 | Palmer et al. | |
| 8,986,631 B2 | 3/2015 | Berggren et al. | |
| 8,992,642 B2 | 3/2015 | Vik | |
| 8,992,669 B2 | 3/2015 | Ideda et al. | |
| 9,028,794 B2 | 5/2015 | Darde et al. | |
| 9,040,011 B2 | 5/2015 | Filippi et al. | |
| 9,061,911 B2 | 6/2015 | Azad | |
| 9,062,608 B2 | 6/2015 | Allam et al. | |
| 9,068,743 B2 | 6/2015 | Palmer et al. | |
| 9,073,007 B2 | 7/2015 | Park et al. | |
| 9,101,899 B2 | 8/2015 | Singh et al. | |
| 9,126,172 B2 | 9/2015 | Singh et al. | |
| 9,132,402 B2 | 9/2015 | Singh et al. | |
| 9,216,903 B2 | 12/2015 | McKenna et al. | |
| 9,227,844 B2 | 1/2016 | Han et al. | |
| 9,240,604 B2 | 1/2016 | Maenishi et al. | |

(56) References Cited

U.S. PATENT DOCUMENTS

| | | | |
|---|---|---|---|
| 9,242,206 B2 | 1/2016 | Okada et al. |
| 9,249,690 B2 | 2/2016 | Karni et al. |
| 9,260,303 B2 | 2/2016 | Filippi et al. |
| 9,309,130 B2 | 4/2016 | Peng et al. |
| 9,321,643 B2 | 4/2016 | Denis et al. |
| 9,321,655 B2 | 4/2016 | Singh et al. |
| 9,327,973 B1 | 5/2016 | Tsai et al. |
| 9,358,506 B2 | 6/2016 | Cheiky |
| 9,359,201 B2 | 6/2016 | Simakov et al. |
| 9,365,131 B2 | 6/2016 | Jamal et al. |
| 9,399,607 B2 | 7/2016 | Tsai et al. |
| 9,415,298 B1 | 8/2016 | Statzer |
| 9,416,728 B2 | 8/2016 | Palmer et al. |
| 9,493,350 B2 | 11/2016 | Morico et al. |
| 9,523,312 B2 | 12/2016 | Allam et al. |
| 9,550,671 B2 | 1/2017 | Darde et al. |
| 9,556,026 B1 | 1/2017 | Davis et al. |
| 9,556,027 B2 | 1/2017 | Chakravarti et al. |
| 9,580,314 B2 | 2/2017 | Darde et al. |
| 9,583,776 B2 | 2/2017 | Thornton et al. |
| 9,586,819 B2 | 3/2017 | Xu et al. |
| 9,617,152 B2 | 4/2017 | Johnston |
| 9,637,427 B2 | 5/2017 | Tsai et al. |
| 9,685,672 B2 | 6/2017 | Iiyama et al. |
| 9,745,191 B2 | 8/2017 | Pham et al. |
| 9,776,862 B2 | 10/2017 | Fujisawa et al. |
| 9,776,863 B2 | 10/2017 | Iaquaniello et al. |
| 9,802,820 B2 | 10/2017 | Iaquaniello et al. |
| 9,806,364 B2 | 10/2017 | Jamal et al. |
| 9,869,245 B2 | 1/2018 | Allam et al. |
| 9,914,643 B2 | 3/2018 | Allam |
| 9,917,320 B2 | 3/2018 | Thornton et al. |
| 9,944,522 B2 | 4/2018 | Cheiky |
| 9,969,666 B1 | 5/2018 | Roesch et al. |
| 10,008,730 B2 | 6/2018 | Jamal et al. |
| 10,018,115 B2 | 7/2018 | Allam et al. |
| 10,046,673 B1 | 8/2018 | Allam et al. |
| 10,047,671 B2 | 8/2018 | Allam et al. |
| 10,066,870 B2 | 9/2018 | Klein |
| 10,071,909 B2 | 9/2018 | Beltramini et al. |
| 10,093,542 B2 | 10/2018 | Beltramini et al. |
| 10,131,593 B2 | 11/2018 | Okada et al. |
| 10,155,661 B2 | 12/2018 | Kang et al. |
| 10,160,704 B2 | 12/2018 | Roesch et al. |
| 10,218,020 B2 | 2/2019 | Jamal et al. |
| 10,246,326 B2 | 4/2019 | Chlapik et al. |
| 10,252,910 B2 | 4/2019 | Beltramini et al. |
| 10,252,911 B2 | 4/2019 | Beltramini et al. |
| 10,256,489 B2 | 4/2019 | Kakuwa et al. |
| 10,281,203 B2 | 5/2019 | Guillard et al. |
| 10,283,795 B2 | 5/2019 | Jamal et al. |
| 10,288,346 B2 | 5/2019 | Guillard et al. |
| 10,302,357 B2 | 5/2019 | Hernandez et al. |
| 10,308,508 B2 | 6/2019 | Saloway |
| 10,370,248 B2 | 8/2019 | Kang et al. |
| 10,393,431 B2 | 8/2019 | Roesch et al. |
| 10,415,434 B2 | 9/2019 | Allam et al. |
| 10,422,252 B2 | 9/2019 | Allam et al. |
| 10,464,818 B2 | 11/2019 | Filippi et al. |
| 10,472,236 B2 | 11/2019 | Farace et al. |
| 10,533,494 B2 | 1/2020 | Xiao et al. |
| 10,549,991 B2 | 2/2020 | Wix et al. |
| 10,626,014 B2 | 4/2020 | Nicholson et al. |
| 10,633,313 B1 | 4/2020 | Roesch et al. |
| 10,634,048 B2 | 4/2020 | Forrest et al. |
| 10,634,425 B2 | 4/2020 | Guillard et al. |
| 10,662,127 B2 | 5/2020 | Beauchamp et al. |
| 10,703,629 B2 | 7/2020 | Saloway |
| 10,745,276 B2 | 8/2020 | Warta et al. |
| 10,746,461 B2 | 8/2020 | Allam |
| 10,849,714 B2 | 12/2020 | Lehtonen |
| 10,899,612 B2 | 1/2021 | Seo et al. |
| 10,919,761 B2 | 2/2021 | Lehmann et al. |
| 10,960,372 B2 | 3/2021 | Verykios et al. |
| 10,961,122 B2 | 3/2021 | Verykios et al. |
| 10,975,766 B2 | 4/2021 | Allam et al. |
| 10,988,379 B2 | 4/2021 | Fedorov et al. |
| 10,989,113 B2 | 4/2021 | Forrest et al. |
| 11,059,011 B2 | 7/2021 | Yukumoto et al. |
| 11,066,298 B2 | 7/2021 | Rafati et al. |
| 11,091,704 B2 | 8/2021 | Wegerer et al. |
| 11,130,676 B2 | 9/2021 | Nicholson et al. |
| 11,149,634 B2 | 10/2021 | Callahan |
| 11,149,636 B2 | 10/2021 | Callahan |
| 11,168,045 B2 | 11/2021 | Moreo |
| 11,174,208 B2 | 11/2021 | Beauchamp |
| 11,174,759 B2 | 11/2021 | Allam et al. |
| 11,207,649 B2 | 12/2021 | Hoffman et al. |
| 11,208,323 B2 | 12/2021 | Forrest et al. |
| 11,213,795 B2 | 1/2022 | Hassler et al. |
| 11,231,224 B2 | 1/2022 | Allam et al. |
| 11,253,831 B2 | 2/2022 | Verykios et al. |
| 11,285,437 B2 | 3/2022 | Lu et al. |
| 11,305,250 B2 | 4/2022 | Verykios et al. |
| 11,345,593 B2 | 5/2022 | Mortensen |
| 11,351,517 B2 | 6/2022 | Ulber et al. |
| 11,383,978 B2 | 7/2022 | Verykios et al. |
| 11,434,133 B2 | 9/2022 | Song et al. |
| 11,441,838 B2 | 9/2022 | Vu et al. |
| 11,465,094 B2 | 10/2022 | Rah et al. |
| 11,479,462 B1 | 10/2022 | Spicer |
| 11,485,635 B2 | 11/2022 | Kawamoto et al. |
| 11,485,637 B2 | 11/2022 | Coleman et al. |
| 11,491,437 B2 | 11/2022 | Gary et al. |
| 11,491,456 B2 | 11/2022 | Ko |
| 11,492,254 B2 | 11/2022 | Harale et al. |
| 11,492,255 B2 | 11/2022 | Younes et al. |
| 11,506,122 B2 | 11/2022 | Allam et al. |
| 11,512,257 B1 | 11/2022 | Spicer et al. |
| 11,535,514 B2 | 12/2022 | Mays et al. |
| 11,554,955 B2 | 1/2023 | Tranier |
| 11,583,798 B2 | 2/2023 | Chai et al. |
| 11,583,824 B2 | 2/2023 | Harale et al. |
| 11,597,649 B2 | 3/2023 | Krishnamoorthy et al. |
| 11,607,657 B2 | 3/2023 | Verykios et al. |
| 11,608,266 B2 | 3/2023 | Moore et al. |
| 11,614,280 B2 | 3/2023 | Ko |
| 11,618,676 B2 | 4/2023 | Hill et al. |
| 2002/0004152 A1 | 1/2002 | Clawson et al. |
| 2005/0080146 A1 | 4/2005 | Abbott et al. |
| 2005/0235650 A1* | 10/2005 | Griffin ................ C01B 13/0251 |
| | | 60/39.12 |
| 2006/0064985 A1* | 3/2006 | Buecker ..................... F02C 3/30 |
| | | 60/722 |
| 2007/0130957 A1 | 6/2007 | Hoffmann et al. |
| 2007/0231244 A1 | 10/2007 | Shah et al. |
| 2010/0083666 A1 | 4/2010 | Brook et al. |
| 2012/0277327 A1 | 11/2012 | Han et al. |
| 2012/0292574 A1 | 11/2012 | Terrien et al. |
| 2012/0301391 A1 | 11/2012 | Basini et al. |
| 2013/0205746 A1 | 8/2013 | Allam et al. |
| 2014/0272625 A1* | 9/2014 | Berlowitz ........... H01M 8/0668 |
| | | 429/411 |
| 2016/0363368 A1 | 12/2016 | Zanganeh et al. |
| 2018/0073430 A1* | 3/2018 | Forrest ..................... F02C 3/24 |
| 2018/0128172 A1 | 5/2018 | Allam |
| 2018/0363550 A1 | 12/2018 | Allam et al. |
| 2019/0135626 A1 | 5/2019 | Rafati et al. |
| 2019/0337801 A1 | 11/2019 | Ulber et al. |
| 2020/0172395 A1 | 6/2020 | Choi et al. |
| 2020/0307997 A1 | 10/2020 | Tranier |
| 2020/0368667 A1 | 11/2020 | Obata et al. |
| 2020/0406212 A1 | 12/2020 | Mortensen et al. |
| 2021/0139794 A1 | 5/2021 | Mukthiyar et al. |
| 2021/0155478 A1 | 5/2021 | Shrivastava et al. |
| 2021/0179425 A1 | 6/2021 | Ott |
| 2021/0252471 A1 | 8/2021 | Park |
| 2021/0300757 A1 | 9/2021 | Tadiello et al. |
| 2021/0323818 A1 | 10/2021 | Rafati et al. |
| 2021/0395085 A1 | 12/2021 | Paglieri et al. |
| 2022/0040626 A1 | 2/2022 | Coleman et al. |
| 2022/0048768 A1 | 2/2022 | Schmidt et al. |
| 2022/0089437 A1 | 3/2022 | Shrivastava et al. |
| 2022/0099003 A1 | 3/2022 | Lu et al. |

(56) References Cited

U.S. PATENT DOCUMENTS

| | | |
|---|---|---|
| 2022/0136700 A1 | 5/2022 | Strand et al. |
| 2022/0143549 A1 | 5/2022 | Bauer et al. |
| 2022/0144634 A1 | 5/2022 | Schmidt et al. |
| 2022/0168687 A1 | 6/2022 | Hill |
| 2022/0169500 A1 | 6/2022 | Ko |
| 2022/0169501 A1 | 6/2022 | Matsuo et al. |
| 2022/0185666 A1 | 6/2022 | Streb et al. |
| 2022/0194789 A1 | 6/2022 | Christensen et al. |
| 2022/0203297 A1 | 6/2022 | Lu et al. |
| 2022/0212925 A1 | 7/2022 | Albuali et al. |
| 2022/0212926 A1 | 7/2022 | Wedhaya et al. |
| 2022/0212927 A1 | 7/2022 | Bamagain et al. |
| 2022/0212928 A1 | 7/2022 | østberg et al. |
| 2022/0212949 A1 | 7/2022 | Fadhel et al. |
| 2022/0219975 A1 | 7/2022 | Feinstein |
| 2022/0219978 A1 | 7/2022 | Tewari et al. |
| 2022/0234018 A1 | 7/2022 | Mackic et al. |
| 2022/0259042 A1 | 8/2022 | Ravikumar et al. |
| 2022/0267147 A1 | 8/2022 | Ravikumar et al. |
| 2022/0306463 A1 | 9/2022 | Cruz et al. |
| 2022/0306464 A1 | 9/2022 | Cruz et al. |
| 2022/0306468 A1 | 9/2022 | Cady et al. |
| 2022/0331768 A1 | 10/2022 | Ko |
| 2022/0396480 A1 | 12/2022 | Edlund |
| 2023/0002224 A1 | 1/2023 | Younes et al. |
| 2023/0042457 A1 | 2/2023 | Allam et al. |
| 2023/0061332 A1 | 3/2023 | Stroffolino, IV |
| 2023/0089656 A1 | 3/2023 | Galliot et al. |
| 2023/0104475 A1 | 4/2023 | Nam et al. |
| 2023/0105183 A1 | 4/2023 | Nam et al. |
| 2023/0107936 A1 | 4/2023 | You et al. |

FOREIGN PATENT DOCUMENTS

| | | |
|---|---|---|
| KR | 2011-0133782 | 12/2011 |
| WO | WO 2009/105305 | 8/2009 |
| WO | WO 2012/123752 | 9/2012 |
| WO | WO 2021/055185 | 3/2021 |
| WO | WO 2021/055186 | 3/2021 |
| WO | WO 2021/075802 | 4/2021 |
| WO | WO 2021/083776 | 5/2021 |
| WO | WO 2021/117875 | 6/2021 |
| WO | WO 2021/175662 | 9/2021 |
| WO | WO 2021/189137 | 9/2021 |
| WO | WO 2021/223733 | 11/2021 |
| WO | WO 2021/257944 | 12/2021 |
| WO | WO 2022/003313 | 1/2022 |
| WO | WO 2022/034283 | 2/2022 |
| WO | WO 2022/034284 | 2/2022 |
| WO | WO 2022/034285 | 2/2022 |
| WO | WO 2022/038090 | 2/2022 |
| WO | WO 2022/040677 | 2/2022 |
| WO | WO 2022/100899 | 5/2022 |
| WO | WO 2022/106058 | 5/2022 |
| WO | WO 2022/145618 | 7/2022 |
| WO | WO 2022/173263 | 8/2022 |
| WO | WO 2022/180740 | 9/2022 |
| WO | WO 2022/219822 | 10/2022 |
| WO | WO 2022/229838 | 11/2022 |
| WO | WO 2022/241593 | 11/2022 |
| WO | WO 2022/253460 | 12/2022 |

* cited by examiner

POWER PRODUCTION WITH COGENERATION OF FURTHER PRODUCTS

CROSS-REFERENCE TO RELATED APPLICATIONS

The present application is a U.S. National Stage of International Patent Application PCT/IB2020/055536, filed Jun. 12, 2020 and claims priority to U.S. Provisional Patent Application No. 62/860,974, filed Jun. 13, 2019. The disclosures of each of the applications noted above are incorporated herein by reference in their entirety.

FIELD OF THE DISCLOSURE

The present disclosure relates to systems and methods for power production with cogeneration of one or more further products. More particularly, one or more chemical products, such as hydrogen, and/or heat production may be provided simultaneously with power production, such as utilizing a supercritical carbon dioxide power cycle.

BACKGROUND

Various methods have been proposed for the production of hydrogen gas such as through conversion of natural gas (e.g., utilizing steam methane reforming, autothermal reforming, dry reforming, or the like) or conversion of coal and biomass resources (e.g., utilizing gasification, pyrolysis, or the like). For example, U.S. Pat. No. 8,409,307 discloses a process and system for providing hydrogen at a high level of reliability from a gasification system by integrating it with steam methane reforming (SMR). The integrated schemes are disclosed therein as maximizing the reliability of production of high value products such as hydrogen through gasification while minimizing the impact of high natural gas price on hydrogen production by SMR. There is extensive activity throughout the world with respect to producing hydrogen either via SMR (which is predominantly used) or through coal gasification (to a lesser extent). These are typically standalone chemical production facilities. Although less common, it is known to operate plants for syngas production for both hydrogen generation as well as power production.

Whether hydrogen is generated through the reforming of natural gas or the gasification of coal, the raw syngas that is produced must undergo further processing before a nominally pure stream of hydrogen is created. Often fossil fuel derived syngas will undergo conversion and removal of nitrogen, sulfur, and carbon based compounds through dedicated pieces of equipment/plants. Additionally, ancillary processes are often required in order to support the nitrogen, sulfur, and carbon handling facilities. This can include any number of processing steps including: high temperature steam heat recovery; low temperature heat rejection; process stream refrigeration; particulate filtration; heavy metals removal; water-gas shift reactions; carbonyl sulfide hydrolysis; hydrodesulfurization reactions; hydrodenitrogenation reactions; methanation reactions; acid gas stripping of hydrogen sulfide; acid gas stripping of carbon dioxide; and condensate removal. The application of these processing steps leads to large CAPEX and OPEX requirements in addition to the loss of energy due to variations in equipment temperature requirements and associated heat transfer inefficiencies. Furthermore, hydrogen production facilities that are paired with power generation units typically provide fuel to the power cycle in the form of excess syngas, separated hydrogen (should CCS be required), or waste tail gases (e.g., polluted hydrogen streams). Such approaches lead to valuable feedstock derived hydrogen being consumed. Accordingly, there remains a need in the art for processes allowing for efficient cogeneration of power as well as various further products, such as hydrogen.

SUMMARY OF THE DISCLOSURE

The present disclosure relates to cogeneration of power and one or more further products, such as a chemical product or an energy product (e.g., heat). In one or more embodiments, the present disclosure particularly can be configured to utilize a high pressure stream to facilitate heat recuperation and power generation while providing a cooled process stream that can be further treated to provide one or more chemical products. For example, raw syngas can undergo simple ambient temperature removal of one or more of solids, metals, and condensates prior to undergoing a gas separation to provide a stream of hydrogen gas. Further process streams can then be combined as needed to generate a variety of even further chemical products.

In one or more embodiments, the present disclosure thus can provide methods for co-generation of power and one or more chemical products. In example embodiments, such methods can comprise: carrying out a power production cycle effective for generating power; providing a heated stream comprising at least carbon monoxide and hydrogen; cooling the heated stream comprising at least carbon monoxide and hydrogen such that heat therefrom is transferred to at least one stream in the power production cycle and a cooled stream comprising at least carbon monoxide and hydrogen is provided; and subjecting the cooled stream comprising at least carbon monoxide and hydrogen to one or more purification steps so as to provide a stream comprising predominately hydrogen. In further embodiments, such methods can be characterized in relation to one or more of the following statements, which can be combined in any number and order.

Carrying out the power production cycle can comprise carrying out a combustion step where fuel is combusted in the presence of a working fluid comprising $CO_2$.

The heated stream comprising at least carbon monoxide and hydrogen can be a syngas stream.

The syngas stream can be formed in a syngas generation unit.

The heat created in the power production cycle can be transferred to the syngas generation unit.

The heat from the heated stream comprising at least carbon monoxide and hydrogen can be transferred to a stream of recycled $CO_2$ in the power production cycle.

The method further can comprise passing a portion of the cooled stream comprising at least carbon monoxide and hydrogen to the power production cycle for combustion therein.

Subjecting the cooled stream comprising at least carbon monoxide and hydrogen to one or more purification steps can be effective to provide a second stream that is a hydrogen-depleted stream.

The method further can comprise passing at least a portion of the hydrogen-depleted stream to the power production cycle for combustion therein.

The method further can comprise passing at least a portion of the hydrogen-depleted stream through a separation unit configured to separate carbon dioxide therefrom.

The separation unit can be a low temperature $CO_2$ separation unit configured to cool the at least a portion of the hydrogen-depleted stream to a temperature sufficient for separation of the carbon dioxide in a liquefied form.

The low temperature $CO_2$ separation unit can be configured to cool the at least a portion of the hydrogen-depleted stream to a temperature that is about 2° C. to about 25° C. greater than a freezing temperature of the at least a portion of the hydrogen-depleted stream.

The method further can comprise combining at least a portion of the stream comprising predominately hydrogen with nitrogen from a nitrogen source under conditions effective to form ammonia.

The nitrogen source can be an air separation unit.

The oxygen from the air separation can be utilized as an oxidant in one or both of the power production cycle and a syngas generation unit.

The method further can comprise combining carbon dioxide with at least a portion of the ammonia under conditions effective to form urea.

At least a portion of the carbon dioxide can be withdrawn from the power production cycle.

In one or more embodiments, the present disclosure can provide systems for co-generation of power and one or more chemical products. In example embodiments, such systems can comprise: a power cycle unit configured for power generation; a syngas generation unit effective for providing a heated syngas stream; one or more heat exchange elements configured for exchanging heat from the heated syngas stream to at least one stream in the power cycle unit and providing a cooled syngas stream; and at least one separation unit configured to separate the cooled syngas stream into a first stream comprising predominately hydrogen and a second stream. In further embodiments, such systems can be further characterized in relation to one or more of the following statements, which can be combined in any number or order.

The system further can comprise an ammonia synthesis unit configured to receive at least a portion of the first stream comprising predominately hydrogen and to receive a stream comprising nitrogen and form a stream comprising ammonia.

The system further can comprise an air separation unit configured for providing oxygen to the power cycle and for providing the stream comprising nitrogen to the ammonia synthesis unit.

The system further can comprise a urea synthesis unit configured to receive at least a portion of the stream comprising ammonia and to receive a stream comprising carbon dioxide and form a stream comprising urea.

The system further can comprise a $CO_2$ separation unit configured to receive at least a portion of the second stream and provide the stream comprising carbon dioxide.

The at least one separation unit can include one or both of a membrane separator and a pressure swing adsorption unit.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

DETAILED DESCRIPTION OF THE DISCLOSURE

Figure 1:
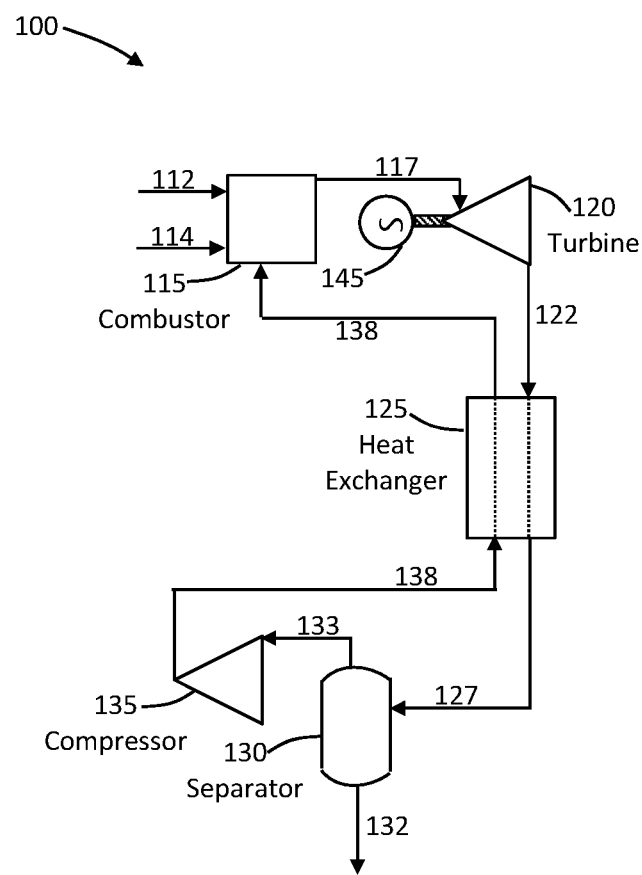
FIG. 1 is a flow diagram showing a power production cycle and elements thereof useful in a co-generation system and process according to embodiments of the present disclosure.

The present subject matter will now be described more fully hereinafter with reference to exemplary embodiments thereof. These exemplary embodiments are described so that this disclosure will be thorough and complete, and will fully convey the scope of the subject matter to those skilled in the art. Indeed, the subject matter can be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

In one or more embodiments, the present disclosure provides for cogeneration of power and one or more further products (e.g., a chemical entity or entities and/or heat) through operation of a power production cycle and treatment of a high pressure stream, such as a syngas stream. The present systems and methods thus can utilize heat transfer between two or more processes or processing units to improve efficiency of one or more of the processes. Likewise, the present systems and methods can beneficially provide one or more product streams at a reduced cost compared to known methods for preparing such products.

As used herein syngas (or synthesis gas) is understood to reference a chemical mixture comprising at least hydrogen and carbon monoxide. The syngas is typically a gaseous mixture, although a mixed-phase syngas may also be utilized. Moreover, although it can be preferable to utilize a substantially pure syngas stream (e.g., comprising 95% or greater, 99% or greater, or 99.5% or greater hydrogen and carbon monoxide), the present disclosure does not necessarily exclude the presence of further chemical moieties in the syngas being utilized. The syngas can be subjected to one or more treatment steps as otherwise described herein to generate one or more desired chemical products, and the treatment steps can include utilization of one or more streams generated in a co-operated power production cycle.

A power production cycle as discussed herein, or a power production plant, can incorporate a variety of elements for carrying out the power production cycle. Non-limiting examples of elements that may be included in a power production plant (and method of operation thereof) according to the present disclosure are described in U.S. Pat. Nos. 8,596,075, 8,776,532, 8,869,889, 8,959,887, 8,986,002, 9,062,608, 9,068,743, 9,410,481, 9,416,728, 9,546,814, 10,018,115, and U. S. Pat. Pub. No. 2012/0067054, the disclosures of which are incorporated herein by reference.

In one or more embodiments, a power production cycle useful according to the present disclosure can include any system and method wherein $CO_2$ (particularly supercritical $CO_2$— or $sCO_2$) is used in a work stream. As a non-limiting example, a recycle $CO_2$ stream is provided at high temperature and high pressure, is input to a combustor wherein a carbonaceous fuel is combusted in oxygen, is expanded across a turbine to produce power, is cooled in a heat exchanger, is purified to remove water and any other impurities, is pressurized, is re-heated using the heat taken from the turbine exhaust, and is again passed to the combustor to repeat the cycle. Such system and method are beneficial in that all fuel and combustion derived impurities, excess $CO_2$, and water are removed as a liquid or a solid (e.g., ash), and there is virtually zero atmospheric emission of any streams. The system and method achieves high efficiency through, for example, the use of low temperature level (i.e., less than 500° C.) heat input after the recycle $CO_2$ stream has been re-pressurized and before combustion.

A power production cycle according to the present disclosure can include more steps or fewer steps than described above and can generally include any cycle wherein a high pressure recycle $CO_2$ stream is expanded for power production and recycled again for further power production. As used herein, a high pressure recycle $CO_2$ stream can have a pressure of at least 100 bar (10 MPa), at least 200 bar (20 MPa), or at least 300 bar (30 MPa). A high pressure recycle $CO_2$ stream can, in some embodiments, have a pressure of about 100 bar (10 MPa) to about 500 bar (50 MPa), about 150 bar to about 450 bar (45 MPa), or about 200 bar (20 MPa) to about 400 bar (40 MPa). Reference to a high pressure recycle $CO_2$ stream herein may thus be a $CO_2$ stream at a pressure within the foregoing ranges. Such pressures also apply to references to other high pressure streams described herein, such as a high pressure work stream comprising $CO_2$. In some embodiments, a power production cycle can be a cycle wherein a recycled $CO_2$ stream is subjected to repeated compression, heating, combustion, expansion for power production, and cooling.

As a non-limiting example, a power production system 100 and method of use thereof is illustrated in FIG. 1. As illustrated therein, a power production cycle can include a combustor 115 where a carbonaceous fuel feed 112 and an oxidant feed 114 are combusted in the presence of a recycle $CO_2$ stream 138 to form a high pressure, high temperature combustion product stream 117 that is expanded in a turbine 120 to produce power with a generator 145. The exhaust stream 122 from the turbine 120 at high temperature is cooled in a recuperative heat exchanger 125 to produce a low pressure, low temperature $CO_2$ stream 127 that is passed through a separator 130 with condensed products 132 (e.g., water) and a substantially pure recycle $CO_2$ stream 133 exiting therefrom. A substantially pure recycle $CO_2$ stream can comprise at 95%, at least 98%, at least 99%, or at least 99.5% molar $CO_2$. The substantially pure recycle $CO_2$ stream 133 is compressed in compressor 135 to form the high pressure recycle $CO_2$ stream 138 (e.g., having a pressure in a range as described above) that is passed to the recuperative heat exchanger 125 where it is heated against the cooling turbine exhaust stream 122.

A power production cycle such as shown in FIG. 1 can be advantageous for use according to the present disclosure at least in part because of the ability to recuperate a significant amount of the heat from the turbine exhaust 122 for use in re-heating the recycle $CO_2$ stream after compression and before passage to the combustor 115. Efficiency, however, can be limited by the ability to add enough heat to raise the temperature of the recycle $CO_2$ stream 138 exiting the hot end of the recuperative heat exchanger 125 to be sufficiently close to the temperature of the turbine exhaust 122 entering the hot end of the recuperative heat exchanger. The need for input of additional heating is identified in U.S. Pat. No. 8,596,075, and various possible sources of low grade heat (e.g., at a temperature of less than about 500° C.) are identified.

In some embodiments, a power production cycle for use as described herein can include any power production cycle whereby a working fluid comprising $CO_2$ is repeatedly cycled at least through stages of compressing, heating, expansion, and cooling. In various embodiments, a power production cycle for use according to the present disclosure may include combinations of the following steps:

combustion of a carbonaceous fuel with an oxidant in the presence of a recycled $CO_2$ stream to provide a combustion product stream at a temperature of at least about 500° C. or at least about 700° C. (e.g., about 500° C. to about 2000° C. or about 600° C. to about 1500° C.) and a pressure of at least about 100 bar (10 MPa) or at least about 200 bar (20 MPa) (e.g., about 100 bar (10 MPa) to about 500 bar (50 MPa) or about 150 bar (15 MPa) to about 400 bar (40 MPa));

expansion of a high pressure recycled $CO_2$ stream (e.g., at a pressure as noted above) across a turbine for power production;

cooling of a high temperature recycled $CO_2$ stream (e.g., at a pressure as noted above), particularly of a turbine discharge stream, in a recuperative heat exchanger;

condensing of one or more combustion products (e.g., water) in a condenser, the combustion products being present particularly in a combustion product stream that has been expanded and cooled;

separating water and/or further materials from $CO_2$ to form a recycled $CO_2$ stream;

compressing a recycled $CO_2$ stream to a high pressure (e.g., a pressure as noted above), optionally being carried out in multiple stages with optional inter-cooling to increase stream density; and heating a compressed recycled $CO_2$ stream in a recuperative heat exchanger, particularly heating against a cooling turbine exhaust stream.

In further embodiments, the present disclosure also relates to power production systems. In particular, such systems can comprise one or more pumps or compressors configured to compress a $CO_2$ stream to a high pressure as described herein. The systems can comprise one or more valves or splitters configured to divide the compressed $CO_2$ stream into at least a first portion $CO_2$ stream and a second portion $CO_2$ stream. The systems can comprise a first heat exchanger (or heat exchange unit comprising a plurality of sections) configured to heat a $CO_2$ stream against a high temperature turbine discharge stream and optionally provide heating to one or more further streams. The systems can comprise at least one turbine configured to expand a $CO_2$ containing stream to produce power. The systems can comprise one or more transfer elements configured to transfer heat between one or more streams. The systems can comprise a combustor configured to combust a carbonaceous fuel in an oxidant in the presence of the $CO_2$ stream.

The systems of the present disclosure can comprise at least one compressor configured to compress a $CO_2$ stream to a high pressure as described herein, at least one combustor downstream from the compressor, at least one turbine downstream from the combustor and upstream from the compressor, and at least one heat exchanger positioned to receive a stream from the at least one compressor and to receive a separate stream from the at least one turbine. Optionally, a separator can be positioned downstream from the heat exchanger and upstream from the compressor. Further optionally, a compressor can be positioned upstream from the compressor and downstream from the first heat exchanger. The system can further comprise one or more valves or splitters as necessary.

As previously discussed, a power production cycle, being configured according to any useful embodiments including, but not limited, to those described above, can be combined with forming and/or processing of a syngas stream in a manner such that further, useful products are provided in addition to the power attributable to the power production cycle. Systems and methods suitable for such cogeneration of power and one or more further products is illustrated according to one or more embodiments of the present disclosure in FIG. 2.

Figure 2:
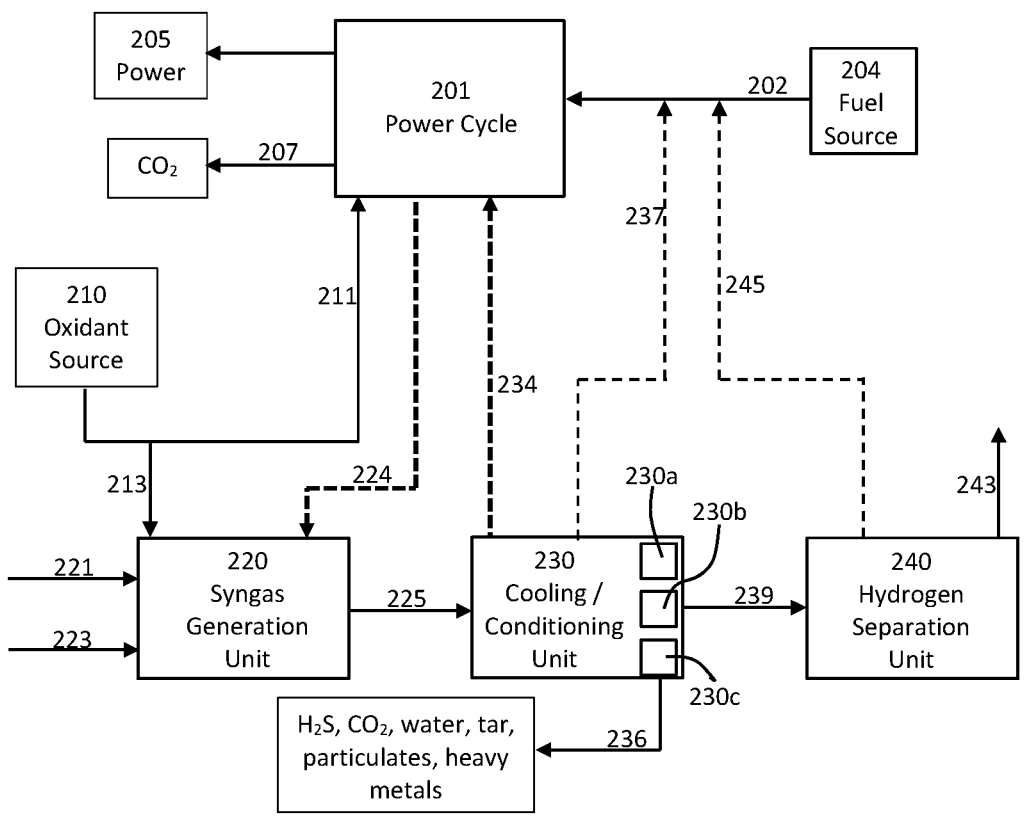
FIG. 2 is a flow diagram showing a combination of elements useful according to embodiments of the present disclosure for forming a plurality of end products, including, but not limited to, power and hydrogen.

A power cycle 201 is illustrated in FIG. 2 and can be any power cycle configured for production of power and being capable of receiving and providing one or more heated streams and, optionally, carbon dioxide. Thus, the power cycle 201, may be a supercritical $CO_2$ power cycle utilizing components and operations as already described above, and the power cycle may include one or more of the components described in relation to FIG. 1. The power cycle 201 receives fuel in line 202 from a fuel source 204, receives oxidant through line 211 from an oxidant source 210, provides power 205 (e.g., electricity) as an output, and optionally can provide a $CO_2$ stream through line 207 as a further output. The oxidant source 210 may be, for example, an air separation unit (ASU) configured for providing substantially pure oxygen (e.g., at least 95%, at least 98%, at least 99%, or at least 99.5% molar $O_2$); however, other oxygen sources or oxidant sources may be utilized. The oxidant source 210 may likewise be a nitrogen source. For example, and ASU can be effective to separate air into a stream of predominately oxygen and a stream of predominately nitrogen. Thus, in some embodiments, the same unit can be configured to be one or both of an oxidant source and a nitrogen source.

Pressurized raw syngas can be processed to generate one or more end products, and the syngas can be provided from a variety of sources, such as being generated by gasification or reforming of a suitable feedstock. The pressurized, raw syngas can be provided into the process illustrated in FIG. 2 as a preformed, sourced material. Alternatively, as illustrated, the syngas optionally can be formed directly as part of the overall process. As shown, fuel in line 221, steam in line 223, and oxidant in line 213 are introduced to a syngas generation unit 220 to provide the pressurized, raw syngas stream in line 225. As illustrated, the syngas generation unit 220 may be a single component or can include a plurality of components that are configured to provide the pressurized, raw syngas stream. In some embodiments, the syngas generation unit 220 can be configured to receive heating from the power cycle 201. As illustrated by line(s) 224, one or more streams may be passed between the power cycle 201 and the syngas generation unit 220 so that heat from the power cycle may be added to the syngas generation unit. For example, heating from a turbine exhaust stream from the power cycle 201 may be transferred directly (e.g., turbine being passed to a heat exchanger in the syngas generation unit 220) or indirectly (e.g., a heat transfer fluid can be used to transfer heat) through line(s) 224. Line 224 is illustrated as dashed to show that it is optional, and the arrow illustrates the direction in which heat is transferred.

The pressurized, raw syngas in line 225 can be processed in cooling/conditioning unit 230, and such processing can include only cooling, can include only one or more conditioning steps, or can include both of cooling and conditioning. For example, the raw syngas can be cooled against a high pressure stream of a heat transfer medium (such as carbon dioxide or even a fuel stream) taken from the power cycle 201, and this heat transfer medium can be utilized for heat recuperation and additional power generation. As illustrated in FIG. 2, line 234 is shown dashed to illustrate that it is optional, and the arrow illustrates the direction in which heat is transferred. In other embodiments, cooling can be carried out by additional or alternative processes. For example, the steam in line 223 may be at least partially generated by heating a water stream using heat from the cooling/conditioning unit 230.

In some embodiments, conditioning of the syngas can be carried out sequentially with cooling. For example, the cooled syngas can then be purified, such as by applying one or more of dewatering, filtering for fine particulate matter, removal of soluble acid gas, and heavy metal removal. As such, it is understood that the cooling/conditioning unit may comprise a plurality of individual components, such as one or more filter units, one or more liquid separation units, one or more membrane units, and the like, and such optional units are illustrated as 230a, 230b, and 230c. The cooling/conditioning unit 230 thus may provide, through line 236, one or more of hydrogen sulfide ($H_2S$), $CO_2$, water, tar, particulates, heavy metals, and/or similar materials that can be separated from the raw syngas. Optionally, clean syngas may be used as all or part of the fuel for the power cycle 201 in line 202. The clean syngas is shown in line 237 being combined with line 202, but it is understood that line 237 may pass directly to a component of the power cycle 201, such as a combustor.

The at least partially purified syngas stream in line 239 (and optionally in line 237), preferably will be nominally dry and cooled. In one or more embodiments, all or part of the purified syngas is transferred through line 239 to a hydrogen separation unit 240, which itself can include one or more separation components. The hydrogen separation unit 240, for example, may include a gas membrane, a pressure swing absorber (PSA), and/or another gas separation system that can be adapted to or configured to favor the separation of hydrogen via its small kinetic diameter and partial pressure. For example, so-called prism membranes (available from Air Products) can be particularly suitable for such separation. In general, the relative permeation rate of gas molecules through such membranes (in descending order) is $H_2O$, $H_2$, $NH_3$, $CO_2$, $H_2S$, $O_2$, Ar, CO, $N_2$, $CH_4$, $C_2H_4$, and $C_3H_8$. The membrane and/or further separation component can enable the formation of two separate flows from the hydrogen separation unit. A first stream in line 243 can be predominantly hydrogen (e.g., greater than 50%, greater than 60%, greater than 75%, greater than 85%, or greater than 90% molar hydrogen). A second stream in line 245 can comprise any one or more of hydrogen, $N_2$, Ar, CO, $CO_2$, $H_2S$, COS, $CH_4$, $C_2H_4$, $C_3H_8$, and any further compounds that may have been part of the original syngas input. Preferably, the second stream will be hydrogen lean (e.g., less than 50%, less than 25%, or less than 10% molar) and, as such, the second stream can be referenced as being a hydrogen-depleted stream. Such a hydrogen-depleted stream typically can comprise some combination of $H_2$ (preferably in a low concentration), $CO_2$, CO, $CH_4$, $N_2$, and Ar. In this manner, the present systems and methods can provide one or more carbonaceous compounds that may be separated from a hydrogen containing stream without the need for dedicated removal equipment targeting the non-hydrogen species' groups. Similarly, the present disclosure can be useful to provide handling of carbonaceous compounds including export/disposal, wherein such handling is provided by the power cycle combustion and compression regimes. Likewise, the present systems and methods can be useful to reduce/eliminate water consumption for the production of hydrogen in that hydrogen production via WGS is not required (although it may be optionally utilized if desired). Specifically, this can be the case since residual feedstock is used as power cycle fuel. The power cycle serves as a means of balancing lost revenue that would have been generated by additional hydrogen as well as a CAPEX offset.

In one or more embodiments, the $H_2$ product provided through line 243 can be separated using $H_2$ pressure swing absorption (PSA) technology. In such embodiments, the processing, cleanup, and cooling of the syngas may be carried out in the cooling/conditioning unit 230 such that syngas with a required $H_2$ content and a desired impurity level can be present in line 239 for input at the inlet of a PSA unit. This can include, for example, carrying out one or more of the following processing steps in the cooling/conditioning unit 230 or in one or more further units combined therewith: carrying out sour or sweet water gas shift; providing for particulate and/or heavy metal removal; carrying our carbonyl sulfide (COS) hydrolysis; carrying out removal of sulfurous material, such as $H_2S$, in an acid gas removal step; and partial or deep removal of $CO_2$. It can be preferred to carry out such separation steps such that the stream in line 239 entering the hydrogen separation unit 240 has a hydrogen content of at least 60% by volume. It is possible to achieve a high hydrogen recovery efficiency using PSA separation when the feed stream entering the unit 240 has a relatively high hydrogen content with low contaminate levels, the presence of which may be detrimental to the lifetime of adsorbent material used in the PSA. It is generally desirable to achieve an $H_2$ recovery efficiency of greater than 75%, greater than 80%, or greater than 85% in the $H_2$ PSA unit, which such unit it utilized.

The first stream in line 243 exiting the hydrogen separation unit (comprising predominately hydrogen gas) can be sent on for final processing, if needed, and then can be used as a chemical feedstock in adjacent facilities and/or exported. The second stream in line 245 (i.e., the hydrogen-depleted stream) exiting the hydrogen separation unit 240 can be input as at least a portion of the fuel in line 202 in the co-operated power cycle 201. Line 245 thus may combine with line 202 or be input directly to a component of the power cycle 201. The second gas stream can be compressed to a sufficiently high pressure (potentially being pre-heated against the raw syngas as noted previously) and combusted with nominally pure oxygen in the power cycle's combustor/turbine. Line 245 thus may be input to a compressor (see element 135) of the power cycle 201 and/or a like compressor may be positioned directly in line 245. The resulting turbine exhaust gas in the power cycle 201 thus can be a mixture of predominantly carbon dioxide and water with traces of (but not exclusively) $O_2$, $N_2$, Ar, NO, and $SO_2$. Referring to FIG. 1 as an example embodiment of the power cycle 201), the turbine exhaust gas can be cooled (e.g., in a recuperative heat exchanger train), such as down to a temperature approaching ambient temperature. Upon the exit of the heat recovery train, the exhaust gas in line 122 can be provided to a water separator 130 for one or more purification steps. The purification can include removal of NOx and SOx impurities to provide a nominally dry and substantially pure stream of carbon dioxide in line 133. A suitable purification unit can be, for example, a DeSNOx unit 470 as described in relation to FIG. 4 below. The substantially pure carbon dioxide can be pressurized (e.g., as part of the power cycle's working fluid recovery process). If desired, sulfur species can also be removed from the syngas via conventional acid gas removal processes prior to syngas combustion. A portion of the pressurized carbon dioxide can be drawn from the working fluid (e.g., in line 207) in order to maintain a mass balance with the fuel and oxygen entering the power production cycle. The withdrawn carbon dioxide stream may be vented, sequestered, or sent on for use as a feedstock in a downstream chemical process, such as urea production.

In some embodiments, the second stream exiting the hydrogen separation unit 240 in line 245 may be further processed in a $CO_2$ separation unit 250 to recover and purify at least a portion of its $CO_2$ content. The $CO_2$ separation unit 250 is preferably a low temperature unit. A low temperature $CO_2$ separation unit can be a unit that is configured to cool at least a portion of the second stream exiting the hydrogen separation unit (i.e., a hydrogen-depleted stream) to a temperature sufficient for separation of any carbon dioxide therein so as to be in a liquefied form. For example, a suitable low temperature $CO_2$ separation unit can be one that is configured to cool at least a portion of the second stream to a temperature that is above but within about 50° C., within about 40° C. or within about 30° C. of the freezing temperature of the second stream. More particularly, the low temperature $CO_2$ separation unit can be configured to cool to a temperature that is about 2° C. to about 25° C., about 2° C. to about 15° C., or about 1° C. to about 5° C. greater than the freezing temperature of the second stream. In such embodiments, it can be desirable to design the overall process such that the $CO_2$ content of the stream in line 245 can be at least 40% by volume of the total output from the hydrogen separation unit 240. This can be beneficial to reduce the overall cost of $CO_2$ separation in a low temperature system. In some embodiments, a preferred $CO_2$ separation process can implement $CO_2$ separation as a liquid at a low temperature within about 1° C. to about 5° C. of the freezing temperature of the compressed dried gas mixture in line 245. The residual $CO_2$ partial pressure in the separated uncondensed gas stream will be at a pressure in the range of about 6 bar to about 7 bar. The low pressure gas stream in line 245 can be compressed to a pressure of about 20 bar to about 70 bar in compressor 247. Higher pressures favor higher $CO_2$ recovery in the separated liquid $CO_2$ phase. The compressed gas then can be dried in a desiccant drier 249, which can be thermally regenerated. For example, when an ASU is used as the oxidant source 210, $N_2$ taken from the ASU in line 219 can be used for heating in the desiccant drier 249. The dried, compressed gas then enters the $CO_2$ separation unit 250. Carbon dioxide can exit the separation unit 250 in line 251 and preferably can have a purity level of at least 80%, at least 90%, at least 95%, or at least 99% molar $CO_2$. Residual $H_2$, along with the CO and $CH_4$ separated from $H_2$ in the hydrogen separation unit 240 can exit the $CO_2$ separation unit 250 through line 253. This uncondensed gas, which is at elevated pressure, can be used as the supplementary fuel in the power cycle 201.

The syngas conditioning and cleanup in the cooling/conditioning unit 230 can, in some embodiments, involve partial removal of $CO_2$ in an acid gas removal step to obtain syngas that has a desired $H_2$ content prior to the $H_2$ recovery step. In such embodiment, $CO_2$ removal can be adjusted such that the cleaned syngas product in line 239 has an $H_2$ content of at least 60% and preferably at least 70% by volume. In such embodiments, the waste gas in line 245 exiting the $H_2$ separation unit 240 may be concentrated in $CO_2$ which would make it a preferred quality for low temperature $CO_2$ separation.

In one or more embodiments, a carbon dioxide product stream (e.g., one or both of stream 207 and stream 251) may be used as a feedstock for chemical production, such as urea synthesis, methanol synthesis, dimethyl ether (DME) synthesis, carbon-cured cement, and synthesis of further products. Beneficially, hydrogen required to generate further chemicals may be sourced from the first gas stream in line 243 exiting the hydrogen separation unit 240 (i.e., the stream of predominately hydrogen gas). For example, hydrogen from line 243 and nitrogen from line 219 (or otherwise sources) may be input to an ammonia synthesis unit 260 to create ammonia (in line 261). Similarly, ammonia formed in this manner (or otherwise source ammonia) can be combined with substantially pure carbon dioxide (e.g., from stream 207 and/or stream 251) to create urea. The nitrogen stream in line 219 can be taken from the ASU and pressurized according to the requirement of the ammonia process, typically to a pressure of about 100 bar or greater. This may be a pressure as taken from the ASU or, in some embodiments, a separate compressor may be provided in-line with line 219 (see compressor 219*a*). Ammonia production reactions are highly exothermic and consequently a significant amount of heat (e.g., in the range of about 400° C. to about 600° C.) is typically generated in ammonia production processes. This heat can be recovered using a heat transfer fluid such as supercritical carbon dioxide and/or water and utilized as supplemental heating in the power production cycle to enhance the efficiency of power generation. This is shown by line 262, which can be input to the power cycle 201.

The presently disclosed systems and methods can allow for substantial elimination or complete elimination of dedicated nitrogen, sulfur, and/or carbon handling systems during the processing of raw syngas for hydrogen production. Furthermore, the presently disclosed systems and methods can provide a desirable level of thermodynamic efficiency that can be comparable to or greater than that of current processes while simultaneously reducing system complexity. This can be achieved, at least in part, due to the ability to use low quality sensible heat in the co-operated power cycle 201 (e.g., power cycle 100 in FIG. 1). For example, U.S. Pat. No. 8,596,075, the disclosure of which is incorporated herein by reference, describes methods for low grade heat integration to improve efficiency of a power production cycle, and such low grade heat integration can likewise be incorporated into the power production cycle utilized according to the present disclosure. This can substantially or completely eliminate the need for additional hydrogen production through water gas shift (WGS) reactions in order to maintain production/feedstock utilization efficiency. Through the elimination of such further equipment requirements (e.g., for carrying out WGS reactions, methanation units, and the like), the parasitic energy consumption associated with hydrogen production can be reduced over that of traditional processes. In addition, the integration of hydrogen production with the power production cycle can also enables carbon dioxide capture and compression without the addition of equipment beyond the existing requirements of the power cycle. Moreover, unlike polygeneration concepts where power must be produced using hydrogen or clean syngas, the fuel provided to the power production cycle according to the present disclosure can be include a significant concentration of carbon monoxide while also being hydrogen-depleted, thereby allowing for the greatest preservation of the feedstock's hydrogen content with minimal upstream processing.

The presently disclosed systems and methods can be particularly beneficial in that carbon capture units that are required in known systems (and are typically significantly expensive) can be completely eliminated. Likewise, full conversion of water-gas-shift reactors is not required according to the present disclosure. Even further, high pressure steam generation equipment can be eliminated since low-grade, sensible heat can be used for improved energy efficiency, as noted above, and complicated cooling/refrigeration trains needed for methanation and carbon dioxide capture solvents can also be eliminated. In comparison to known systems, the present disclosure can provide systems and methods that are cost effective, highly efficient, and effective for substantial or complete carbon capture with co-power generation. Thus, the present disclosure provides an easily implementable poly-generation system and method that has not heretofore been achievable according to the prior art.

In light of the foregoing, the present disclosure can provide a variety of configurations wherein cogeneration of power and at least hydrogen can be provided. In such embodiments, a hot syngas stream 225 can be provided from the syngas generation unit 220, which can operate via, for example, coal gasification and/or natural gas partial oxidation, and/or natural gas reforming. The hot syngas stream 225 can be at least partially cooled in unit 230, such as by using a heat transfer fluid. In preferred embodiments, the heat transfer fluid can be a carbon dioxide stream and/or a water stream that is utilized in the power cycle 201. The heat transfer fluid particularly can comprise at least supercritical carbon dioxide. Utilization of the carbon dioxide stream (or other stream) from the power production cycle to cool the syngas stream can be particularly useful to enhance the efficiency of the power generation process. For example, heat transferred from the syngas stream 225 to the carbon dioxide stream (e.g., the stream in line 234) can be used for low grade heating of the recycle carbon dioxide stream in the power cycle to improve the cycle efficiency as previously discussed. The final cooled gas temperature is determined according to the inlet temperature of a Water-Gas Shift (WGS) step that can be carried out in the syngas generation unit 220. The WGS step can be beneficial to react carbon monoxide with steam and generate added hydrogen and carbon dioxide to the system. Shifting can be performed on a slipstream of syngas and not the total syngas stream in order to reduce the cost of shift process and associated equipment. In such as case, the shift step can be designed such that the hydrogen concentration in the recombined total syngas stream can be enough for economic downstream separation. This can be achieved by controlling one or more of the steam fed into the shift reactor, the size of the catalyst bed, and flow rate of the slipstream to the shift reactors. Pressure swing absorber hydrogen recovery beds typically requires at least 60% molar hydrogen in the feed stream to achieve economic hydrogen recovery (e.g., at least 80% molar hydrogen recovery). When hydrogen sulfide is present in the high temperature syngas stream (e.g., when the syngas is provided from a partial oxidation step), a sour WGS step followed by a downstream acid gas removal for hydrogen sulfide separation is typically utilized. In sour WGS, sulfur resistant shift catalysts, such as cobalt-molybdenum based compositions, can be used. Shifted syngas potentially cleaned from sulfur contaminants can then be fed into a hydrogen separation and recovery unit.

Figure 3:
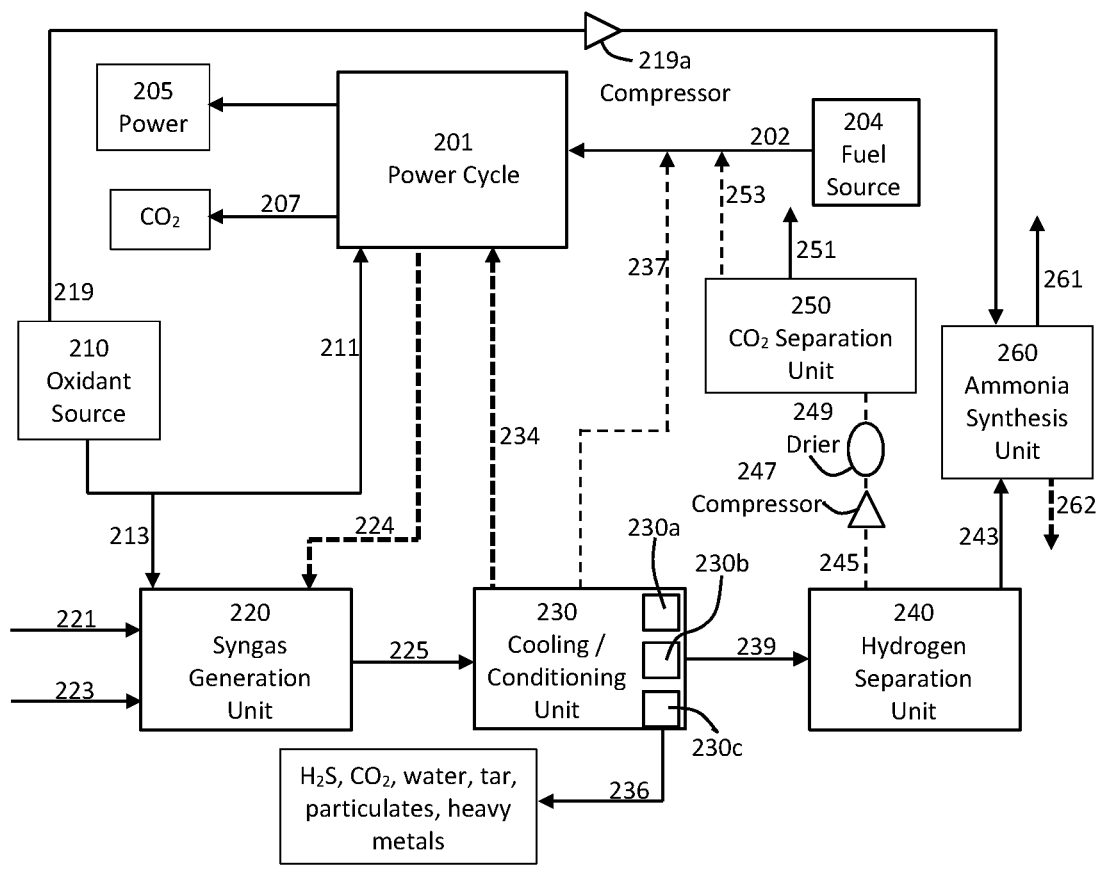
FIG. 3 is a flow diagram showing a combination of elements useful according to embodiments of the present disclosure for forming a plurality of end products, including, but not limited to, power, ammonia, and carbon dioxide.

When cogeneration of power and hydrogen is desired, as discussed above, the tail gas (see line 245 in FIG. 2 or line 253 in FIG. 3) from the hydrogen separation unit 240 can be used as a fuel gas for power generation in a supercritical carbon dioxide power cycle such as described herein. The tail gas from a PSA hydrogen recovery unit typically can be at a pressure of about 1 to 2 bar and can contain hydrogen, carbon oxides, and methane. The tail gas can be pressurized (see compressor 247, which optionally may be present in line 245 in FIG. 2 as well) and sent to power production plant as fuel gas. Excessive shifting of the syngas prior to hydrogen recovery can reduce the heating value of the tail gas from the hydrogen separation unit 240, which will consequently reduce the amount of power that can be generated.

The WGS reaction is exothermic and thus the syngas stream temperature will rise along the length of the shift reactor. The heat from shifted syngas can be recovered using a heat transfer fluid such as supercritical carbon dioxide or water and utilized in a supercritical carbon dioxide power cycle to enhance the efficiency of power generation. After heat recovery from shifted syngas and further cooling, a total syngas stream can be optionally directed to an acid gas removal unit to selectively remove hydrogen sulfide.

In further embodiments, in addition to generation of power, hydrogen, and ammonia, the presently disclosed systems and methods can further be useful in production of urea. As such, a urea synthesis unit can be included downstream of the ammonia production train. This is shown in the embodiment illustrated in FIG. 4; however, it is understood that the urea synthesis unit may likewise be incorporated in the embodiments illustrated in FIG. 3.

Figure 4:
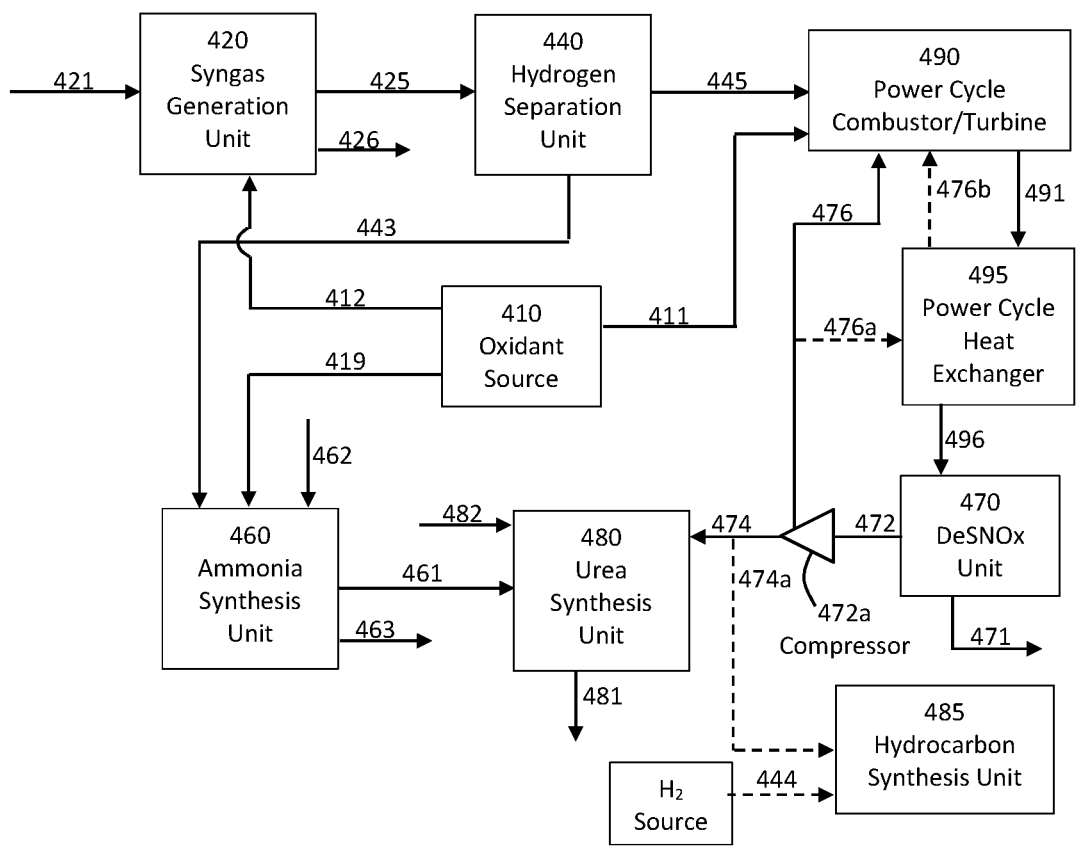
FIG. 4 is a flow diagram showing a combination of elements useful according to embodiments of the present disclosure for forming a plurality of end products, including, but not limited to, power and one or more chemical products.

Referring to FIG. 4, fuel in line 421 is passed to the syngas generation unit 420, which may be configured as otherwise described above. Moreover, one or more further feed streams (e.g., a steam stream) may be input to the syngas generation unit 420 as desired. Raw syngas exits the syngas generation unit in line 425 and is passed to the hydrogen separation unit 440. If needed, a cooling and/or conditioning unit (see unit 230 above) may be provided between the syngas generation unit 420 and the hydrogen separation unit 440 to achieve the desired conditions of the raw syngas entering the hydrogen separation unit. A fuel gas exiting the hydrogen separation unit 440 through line 445 can be passed to a power cycle combustor/turbine while a stream of predominately hydrogen exits the hydrogen separation unit 440 in line 443. The fuel gas in line 443 is a hydrogen-depleted stream of one or more fuel gases and preferably can include a significant content of CO. Oxidant in line 411 is passed from the oxidant source 410 into the combustor/turbine unit 490. Likewise, oxidant in line 412 is passed from the oxidant source 410 to the syngas generation unit 420. As noted previously, the oxidant source 410 may be an ASU or other suitable unit configured for providing oxygen in lines 411/412 and nitrogen in line 419, which is further discussed below. If needed, a further fuel source may be used to supplement the fuel gas in line 445 and/or may be passed directly to the combustor/turbine 490.

The power cycle components illustrated in FIG. 4 may be supplemented as desired to include one or more elements already described above and illustrated in FIG. 1. The power cycle combustor/turbine 490 may be a single, combined unit that is configured for both combustion and expansion of the combustor exhaust, or a separate combustor and turbine may be utilized. Expanded exhaust in line 491 exits the combustor/turbine and is passed to the power cycle heat exchanger 495 to be cooled and provide a cooled exhaust stream in line 496. The cooled exhaust is treated in the DeSNOx unit 470 to remove sulfur compounds primarily and optionally any nitrogen compounds present in the exhaust stream. Sulfur and/or nitrogen compounds exit the unit 470 through line 471 for disposal or other uses, and a substantially pure stream of $CO_2$ (e.g., at least 80%, at least 90%, at least 95%, or at least 99% molar $CO_2$) exits in line 472. All or part of the $CO_2$ in line 472 may be recycled back to the power cycle combustor/turbine through line 476. As illustrated, all or part of the $CO_2$ in line 472 may be passed in line 476a through the power cycle heat exchanger 495 for re-heating prior to passage in line 476b to the combustor/turbine 490. The $CO_2$ in line 472 may be compressed in compressor 472a prior to passage back to the combustor/turbine.

Hydrogen in line 443 and nitrogen in line 419 can be combined in the ammonia synthesis unit 460 to provide a stream of ammonia in line 461 as previously discussed above. Part of all of the ammonia in line 461 may be passed to the urea synthesis unit 480 to produce a stream of urea in line 481. The urea synthesis unit 480 can be fed with high pressure carbon dioxide from the power production cycle and along with the ammonia from the ammonia synthesis unit. The $CO_2$ for urea synthesis is provided in line 474 and can be taken at the same or different pressure as the $CO_2$ that is recycled to the combustor/turbine unit 490 through line 476. Steam may be input to the urea synthesis unit through line 482. The steam may come from any suitable source, including an outside source. Moreover, in embodiments wherein steam may be formed in the power cycle, steam can be withdrawn from the power cycle for use in the urea synthesis unit. As illustrated in FIG. 4, steam may be taken from the syngas generation unit in line 426, and all or part of the steam in line 426 may be input through line 482 into the urea synthesis unit 480. Likewise, all or part of the steam in line 426 may be input to the ammonia synthesis unit 460 through line 462. As such, steam may be output from the ammonia synthesis unit 460 through line 463, and all or part of the steam in line 463 may be passed through line 482 into the urea synthesis unit 480 through line 482.

As can be seen from the foregoing, the present disclosure can provide a facility that adapts a power production cycle (e.g., utilizing a fuel source that is hydrogen-depleted) for the co-production of a hydrogen export stream, which eliminates the typical gas processing equipment required for such hydrogen production, leading to significant cost savings while simultaneously generating power and capturing carbon dioxide normally emitted by this process. In some embodiments, such facility can be configured so that the part or all of the hydrogen export stream may also be used in conjunction with part or all of a carbon dioxide export stream from a power production cycle to produce additional value-added products, such as urea.

Examples

Co-Production of Urea and Power

With reference again to FIG. 4, co-production of urea and power may be achieved, in some embodiments, utilizing more specific process and system conditions. In particular, a feedstock (line 421) is sent to a gasifier or a SMR unit (420) to create raw syngas (line 425). Hydrogen is separated from raw syngas using a pressure swing absorption (PSA) separation unit (440) to provide hydrogen (line 443) for Ammonia synthesis. CO-rich syngas (line 445) is sent to a power cycle combustor and turbine (490) for power generation. Turbine exhaust (containing predominately carbon dioxide) is directed through line 491 into the power cycle heat exchanger (495) for high grade heat recuperation. A carbon dioxide stream (line 496) exiting the heat exchanger is then directed to a water separator (DeSNOx unit 470) for water removal. In the water removal column, any SOx and NOx from the combustion flue gas can be removed in the forms of $H_2SO_4$ and $HNO_3$ (line 471). Sulfur species from coal used in the syngas production can be removed from the syngas via conventional acid gas removal processes. Carbon dioxide exiting the water separator unit in line 472 can be at ambient temperature and a pressure of about 30 bar, and the carbon dioxide can be substantially free of liquid water and SOx/NOx. A portion (e.g., about 60% to about 95%, about 75% to about 95%, or about 80% to about 90% by weight) of this carbon dioxide stream can be sent back to the power production cycle combustor/turbine through line 476 (preferably passing through the heat exchanger 495 for heat recovery via lines 476a and 476b). The remaining portion of the carbon dioxide can be sent via line 474 to a urea synthesis unit. One or both of the CO2 streams in line 474 and 476 may be first compressed to the same or different pressures in compressor 472a, which may be a multi-stage compressor with optional inter-stage cooling. Nitrogen in line 419 (e.g., from the power cycle ASU 410) and hydrogen in line 443 from the membrane separator 440 are sent to an ammonia synthesis unit 460. The operating condition of the ammonia synthesis unit 460 can be about 200-250 bar and about 400° C. to about 500° C. Therefore, both of the nitrogen and the hydrogen are preferably provided in a compressed and pre-heated condition. The heat source of the ammonia synthesis process can be derived from the turbine exhaust in unit 490, an uncooled compressor (e.g., in the ASU 410 or the $CO_2$ compressor 472a, or another heat source in the system. Ammonia produced in line 461 from the ammonia synthesis unit 460 can be sold as a chemical product or can be sent to a urea synthesis unit 480 along with substantially pure carbon dioxide from the power production cycle (line 474).

Co-Production of Hydrogen and Power

A feedstock is sent to a gasifier or a SMR unit (e.g., unit 420) to create raw syngas (line 425). Hydrogen is separated from raw syngas using a PSA separation unit (440) for synthesis of one or more chemicals, such as ammonia and urea (see the example above) or refinery operations, such as hydrotreating. Hydrogen-depleted syngas (line 445) is sent to a power cycle combustor and turbine (490) for power generation. Turbine exhaust (containing predominately carbon dioxide) is directed through line 491 into the power cycle heat exchanger (495) for high grade heat recuperation. A carbon dioxide stream exiting the heat exchanger is then directed through line 496 to a water separator for water removal (which can be the DeSNOx unit 470 or a simple water separation unit (see element 130 in FIG. 1). Sulfur species from coal used in the syngas production can be removed from the syngas via conventional acid gas removal processes, and such processes may be units included in syngas generation unit 420. Carbon dioxide exiting the water separator unit (line 472) can be at ambient temperature and a pressure of about 30 bar, and the carbon dioxide can be substantially free of liquid water and SOx/NOx. All or a portion of this carbon dioxide stream can be sent back to the power production cycle combustor/turbine as otherwise described above. The produced hydrogen can be used for the synthesis of other chemicals, such as ammonia, or can be directly fed into other processes, such as hydrotreating of hydrocarbons. Any remaining portion of the carbon dioxide can be directed through optional line 474a to permanent underground sequestration or sent to a hydrocarbon synthesis unit 485 where $H_2$ from renewables and $CO_2$-free sources can be provided to generate additional hydrocarbon products. $H_2$ in line 444 can be passed to the hydrocarbon synthesis unit 485 from one or more outside sources. Such hydrogen source preferably comes from a source that is renewable and that has low or no associated carbon dioxide emission. $CO_2$ for use in the hydrocarbon synthesis unit 485 may be taken in line 474a from the power cycle (or from another $CO_2$-containing stream in the power cycle) and/or may be taken from line 251 exiting the $CO_2$ separation unit 250. $CO_2$ and $H_2$ are reacted in the synthesis reactor 485 at a temperature of about 200° C. to about 400° C. or about 250° C. to about 350° C. (e.g., around 300° C.) and a pressure of about 20 bar to about 40 bar or about 25 bar to about 35 bar (e.g., around 30 bar) in the presence of a composite catalyst. $CO_2$ from turbine exhaust can be cooled down to 300° C. and directly sent to the synthesis reactor through line 474a, before or after compression. Since the synthesis is an exothermic reaction, the heat released from the process can be used to preheat the recycled $CO_2$ to increase the power cycle efficiency Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

The invention claimed is:

1. A method for co-generation of power and one or more chemical products, the method comprising:
   carrying out a power production cycle effective for generating power;
   providing a heated stream comprising at least carbon monoxide and hydrogen;
   cooling the heated stream comprising at least carbon monoxide and hydrogen such that heat therefrom is transferred to at least one stream in the power production cycle and a cooled stream comprising at least carbon monoxide and hydrogen is provided;
   subjecting the cooled stream comprising at least carbon monoxide and hydrogen to one or more purification steps so as to provide a stream comprising predominately hydrogen and to provide a second stream that is a hydrogen-depleted stream; and
   one or both of: passing at least a portion of the hydrogen-depleted stream to the power production cycle for combustion therein; and passing at least a portion of the hydrogen-depleted stream through a separation unit configured to separate carbon dioxide therefrom.

2. The method of claim 1, wherein carrying out the power production cycle comprises carrying out a combustion step where fuel is combusted in the presence of a working fluid comprising $CO_2$.

3. The method of claim 1, wherein the heated stream comprising at least carbon monoxide and hydrogen is a syngas stream.

4. The method of claim 3, wherein the syngas stream is formed in a syngas generation unit.

5. The method of claim 4, wherein heat created in the power production cycle is transferred to the syngas generation unit.

6. The method of claim 1, wherein heat from the heated stream comprising at least carbon monoxide and hydrogen is transferred to a stream of recycled $CO_2$ in the power production cycle.

7. The method of claim 1, further comprising passing a portion of the cooled stream comprising at least carbon monoxide and hydrogen to the power production cycle for combustion therein.

8. The method of claim 1, wherein the separation unit is a low temperature $CO_2$ separation unit configured to cool the at least a portion of the hydrogen-depleted stream to a temperature sufficient for separation of the carbon dioxide in a liquefied form, and optionally wherein the low temperature $CO_2$ separation unit is configured to cool the at least a portion of the hydrogen-depleted stream to a temperature that is about 2° C. to about 25° C. greater than a freezing temperature of the at least a portion of the hydrogen-depleted stream.

9. The method of claim 1, further comprising combining at least a portion of the stream comprising predominately hydrogen with nitrogen from a nitrogen source under conditions effective to form ammonia.

10. The method of claim 9, wherein the nitrogen source is an air separation unit, and optionally wherein oxygen from the air separation is utilized as an oxidant in one or both of the power production cycle and a syngas generation unit.

11. The method of claim 9, further comprising combining carbon dioxide with at least a portion of the ammonia under conditions effective to form urea, and optionally wherein at least a portion of the carbon dioxide is withdrawn from the power production cycle.

12. The method of claim 1, wherein a first portion of the hydrogen-depleted stream is passed to the power production cycle for combustion therein, and a second portion of the hydrogen-depleted stream is passed through a separation unit configured to separate carbon dioxide therefrom.

13. A system for co-generation of power and one or more chemical products, the system comprising:
a power cycle unit configured for power generation;
a syngas generation unit effective for providing a heated syngas stream;
one or more heat exchange elements configured for exchanging heat from the heated syngas stream to at least one stream in the power cycle unit and providing a cooled syngas stream;
at least one separation unit configured to separate the cooled syngas stream into a first stream comprising predominately hydrogen and a second stream that is a hydrogen-depleted stream; and
one or more lines configured for passing at least a portion of the hydrogen-depleted stream to the power production cycle for combustion therein or configured for passing at least a portion of the hydrogen-depleted stream through a separation unit configured to separate carbon dioxide therefrom.

14. The system of claim 13, further comprising an ammonia synthesis unit configured to receive at least a portion of the first stream comprising predominately hydrogen and to receive a stream comprising nitrogen and form a stream comprising ammonia.

15. The system of claim 14, further comprising an air separation unit configured for providing oxygen to the power cycle and for providing the stream comprising nitrogen to the ammonia synthesis unit.

16. The system of claim 14, further comprising a urea synthesis unit configured to receive at least a portion of the stream comprising ammonia and to receive a stream comprising carbon dioxide and form a stream comprising urea.

17. The system of claim 16, further comprising a $CO_2$ separation unit configured to receive at least a portion of the second stream and provide the stream comprising carbon dioxide.

18. The system of claim 13, wherein the at least one separation unit includes one or both of a membrane separator and a pressure swing adsorption unit.

19. A method for co-generation of power and one or more chemical products, the method comprising:
carrying out a power production cycle effective for generating power;
providing a heated stream comprising at least carbon monoxide and hydrogen;
cooling the heated stream comprising at least carbon monoxide and hydrogen such that heat therefrom is transferred to at least one stream in the power production cycle and a cooled stream comprising at least carbon monoxide and hydrogen is provided;
subjecting the cooled stream comprising at least carbon monoxide and hydrogen to one or more purification steps so as to provide a stream comprising predominately hydrogen; and
combining at least a portion of the stream comprising predominately hydrogen with nitrogen from a nitrogen source under conditions effective to form ammonia.

20. A system for co-generation of power and one or more chemical products, the system comprising:
a power cycle unit configured for power generation;
a syngas generation unit effective for providing a heated syngas stream;
one or more heat exchange elements configured for exchanging heat from the heated syngas stream to at least one stream in the power cycle unit and providing a cooled syngas stream;
at least one separation unit configured to separate the cooled syngas stream into a first stream comprising predominately hydrogen and a second stream; and
an ammonia synthesis unit configured to receive at least a portion of the first stream comprising predominately hydrogen and to receive a stream comprising nitrogen and form a stream comprising ammonia.

* * * * *